United States Patent
Chen

(12) 
(10) Patent No.: US 6,507,423 B1
(45) Date of Patent: Jan. 14, 2003

(54) ENERGY CONSERVING DEVICE FOR A REMOTE CONTROLLED APPARATUS

(75) Inventor: Cheng-Feng Chen, Taipei Hsien (TW)

(73) Assignee: Bobson Hygiene International, Inc., Taipei (TW)

(*) Notice: Subject to any disclaimer, the term of this patent is extended or adjusted under 35 U.S.C. 154(b) by 0 days.

(21) Appl. No.: 09/483,201

(22) Filed: Jan. 14, 2000

(51) Int. Cl.$^7$ ............................................. H04B 10/00
(52) U.S. Cl. ............. 359/142; 340/825.69; 340/825.72; 455/343; 348/734
(58) Field of Search ..................... 359/142; 340/825.69, 340/825.72; 348/734; 455/343

(56) References Cited

U.S. PATENT DOCUMENTS

| | | | | |
|---|---|---|---|---|
| 5,109,221 A | * | 4/1992 | Lambropoulos et al. | 340/5.22 |
| 5,680,112 A | * | 10/1997 | Xydis | 340/539 |
| 6,028,855 A | * | 2/2000 | Hirsch | 370/311 |
| 6,198,913 B1 | * | 3/2001 | Sung et al. | 340/10.33 |

* cited by examiner

Primary Examiner—Leslie Pascal
Assistant Examiner—Dzung Tran
(74) Attorney, Agent, or Firm—Brooks & Kushman P.C.

(57) ABSTRACT

An energy conserving device is adapted to be connected to an infrared receiving circuit of a remote controlled apparatus that receives an infrared control signal from a remote controller, and controls the supply of an operating voltage to the infrared receiving circuit. The energy conserving device includes an input voltage unit for providing a voltage output that is lower than the operating voltage, a voltage increasing unit, and a sleep control unit. The voltage increasing unit is operable in one of a wake mode, where the voltage increasing unit is enabled to generate the operating voltage from the voltage output of the input voltage unit and to supply the operating voltage to the infrared receiving circuit, and a sleep mode, where the voltage increasing unit is inhibited from generating the operating voltage to the infrared receiving circuit. The sleep control unit is adapted to receive the infrared control signal from the remote controller, and controls the voltage increasing unit to operate in the wake mode for a predetermined time period upon receiving the infrared control signal from the remote controller, and in the sleep mode when the sleep control unit ceases to receive the infrared control signal after the predetermined time period has elapsed.

6 Claims, 2 Drawing Sheets

ENERGY CONSERVING DEVICE FOR A REMOTE CONTROLLED APPARATUS

BACKGROUND OF THE INVENTION

1. Field of the Invention

The invention relates to a remote controlled apparatus, more particularly to an energy conserving device for a remote controlled apparatus.

2. Description of the Related Art

Infrared remote controlled appliances are widely available in the market. The infrared receiving circuit of a remote controlled appliance, such as a scent releasing apparatus, typically requires a 5-volt operating voltage to operate, and has a relatively large operating power requirement. When commercial AC power is applied as a source of electrical power for the scent releasing apparatus, installation of the latter is limited to within the vicinity of an electrical outlet. Further, when an automobile battery is applied as the source of electrical power for the scent releasing apparatus, the stored energy of the automobile battery is easily used up due to continuous operation of the infrared receiving circuit.

SUMMARY OF THE INVENTION

The object of the present invention is to provide an energy conserving device for a remote controlled apparatus that permits long term operation of the latter with the use of a low voltage power source, such as a battery cell.

According to this invention, an energy conserving device is adapted to be connected to an infrared receiving circuit of a remote controlled apparatus that receives an infrared control signal from a remote controller, and controls the supply of an operating voltage to the infrared receiving circuit. The energy conserving device comprises an input voltage unit for providing a voltage output that is lower than the operating voltage, a voltage increasing unit, and a sleep control unit.

The voltage increasing unit is connected to the input voltage unit, and is adapted to be connected to the infrared receiving circuit. The voltage increasing unit is operable in one of a wake mode, where the voltage increasing unit is enabled to generate the operating voltage from the voltage output of the input voltage unit and to supply the operating voltage to the infrared receiving circuit, and a sleep mode, where the voltage increasing unit is inhibited from generating the operating voltage to the infrared receiving circuit.

The sleep control unit includes a detector circuit, a comparator circuit, and a wake control circuit. The detector circuit is adapted to receive the infrared control signal from the remote controller, and has an output that varies upon receipt of the infrared control signal from the remote controller. The comparator circuit is connected to the detector circuit, compares the output of the detector circuit with a reference signal, and generates a wake control signal upon determining that the detector circuit has received the infrared control signal from the remote controller. The wake control circuit is connected to the comparator circuit and the voltage increasing unit, and controls the voltage increasing unit to operate in the wake mode for a predetermined time period upon receiving the wake control signal from the comparator circuit, and in the sleep mode when the wake control circuit ceases to receive the wake control signal from the comparator circuit after the predetermined time period has elapsed.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
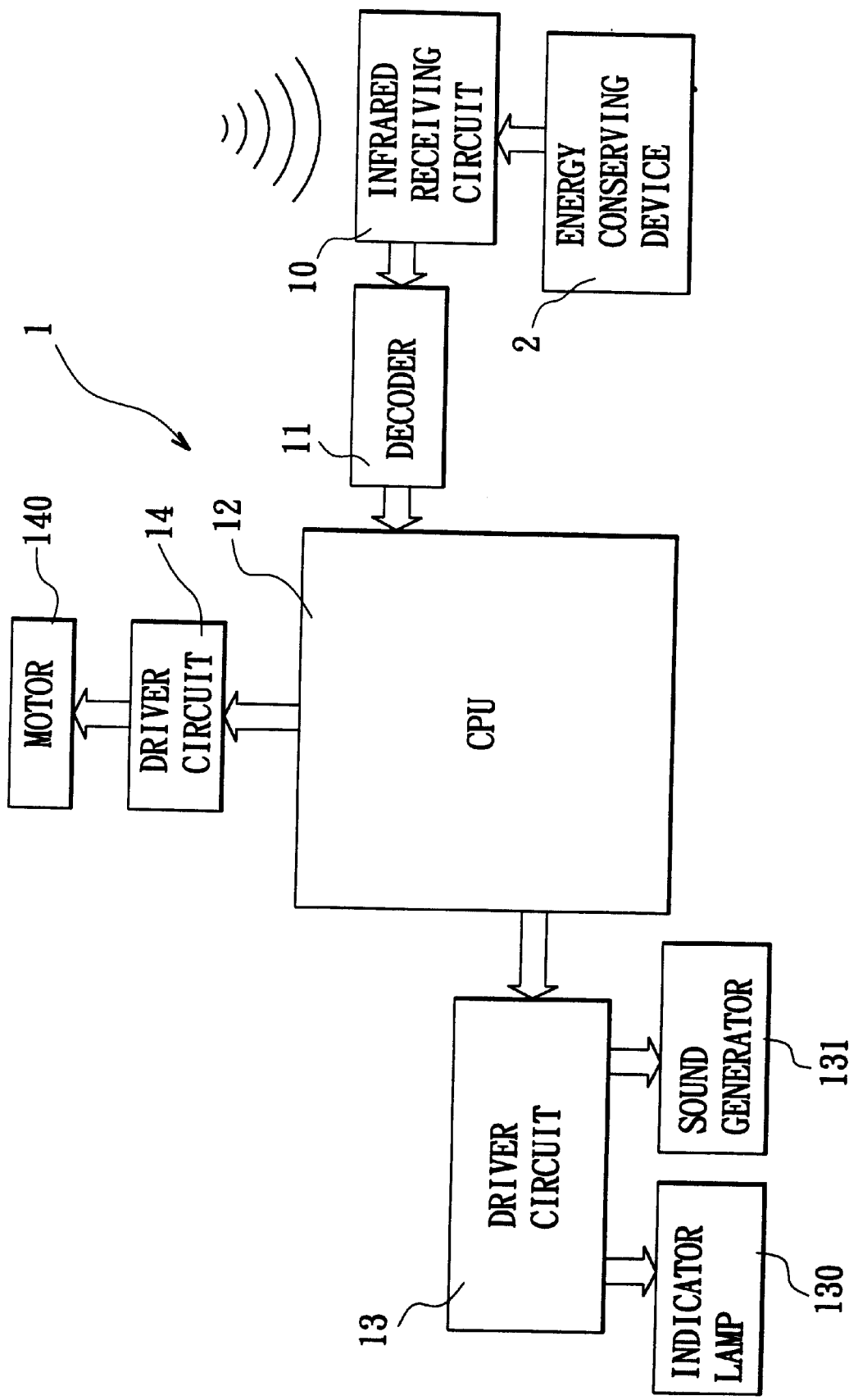
FIG. 1 is a schematic circuit block diagram of a remote controlled apparatus that incorporates the preferred embodiment of an energy conserving device of this invention.
Figure 2:
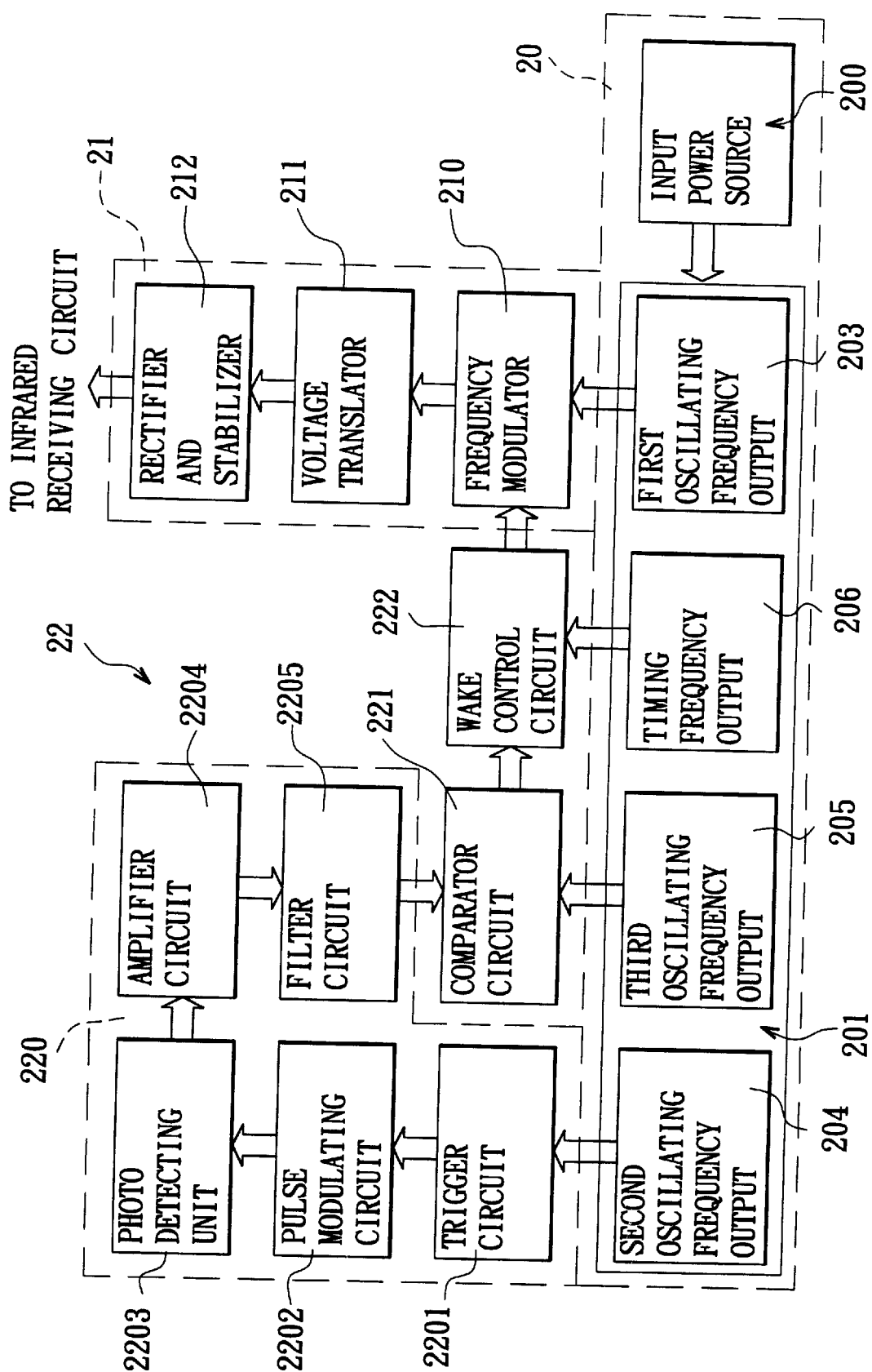
FIG. 2 is a schematic circuit block diagram of the preferred embodiment.

Referring to FIG. 1, a remote controlled apparatus 1 is shown to comprise an infrared receiving circuit 10 for receiving an infrared control signal transmitted by a remote controller (not shown), a decoder 11 connected to the infrared receiving circuit 10 for decoding the infrared control signal, and a central processing unit (CPU) 12 connected to the decoder 11 to receive the decoded output of the latter. According to the decoded output, the CPU 12 activates an indicator lamp 130, a sound generator 131 and a motor 140 via driver circuits 13, 14. The energy conserving device 2 of this invention is connected to the infrared receiving circuit 10, and controls the supply of a 5-volt operating voltage thereto to enable operation of the latter. The energy conserving device 2 includes an input voltage unit 20, a voltage increasing unit 21, and a sleep control unit 22.

The input voltage unit 20 includes an input power source 200 and an oscillating frequency signal generator 201. The input power source 200, such as a battery cell, generates a 1.5-volt output that is lower than the operating voltage of the infrared receiving circuit 10. The oscillating frequency signal generator 201 is connected to the input power source 200, and generates a plurality of voltage outputs with different frequencies. In this embodiment, the oscillating frequency signal generator 201 generates a first oscillating frequency output 203, a second oscillating frequency output 204, a third oscillating frequency output 205, and a timing frequency output 206.

The voltage increasing unit 21 is connected to the oscillating frequency signal generator 201 and the infrared receiving circuit 10, and includes a frequency modulator 210 that receives the first oscillating frequency output 203 from the oscillating frequency signal generator 201, a voltage translator 211 connected to the frequency modulator 210, and a voltage rectifier and stabilizer 212 connected to the voltage translator 211. The voltage increasing unit 21 is operable in one of a wake mode, where the voltage is increasing unit 21 is enabled to generate the operating voltage from the first oscillating frequency output 203 of the oscillating frequency signal generator 201 and to supply the operating voltage to the infrared receiving circuit 10, and a sleep mode, where the voltage increasing unit 21 is inhibited from generating the operating voltage to the infrared receiving circuit 10.

The sleep control unit 22 includes a detector circuit 220, a comparator circuit 221 and a wake control circuit 222.

The detector circuit 220 is connected to the oscillating frequency signal generator 201, and includes a trigger circuit 2201 that receives the second oscillating frequency output 204 from the oscillating frequency signal generator 201, a 0.1 second pulse modulation circuit 2202 connected to the trigger circuit 2201, a photo detecting unit 2203 connected to the pulse modulation circuit 2202, an amplifier circuit 2204 connected to the photo detecting unit 2203, and a filter circuit 2205 connected to the amplifier circuit 2204. The photo detecting unit 2203 is adapted to receive the infrared control signal transmitted by the remote controller (not shown). In this embodiment, the photo detecting unit 2203 is a photo conductive element having a resistance that varies in accordance with the wavelength of a light signal received thereby. The detector circuit 220 thus has a frequency output at the filter circuit 2205 that varies according to the resistance of the photo detecting unit 2203.

The comparator circuit 221 is connected to the filter circuit 2205 and the oscillating frequency signal generator 201, and functions to compare the frequency output of the filter circuit 2205 with the third oscillating frequency output 205 from the oscillating frequency signal generator 201, which serves as a reference signal. The comparator circuit 221 generates a wake control signal when a match is detected, indicating that the detector circuit 220 has received the infrared control signal from the remote controller.

The wake control circuit 222 is connected to the comparator circuit 221, the oscillating frequency signal generator 201, and the frequency modulator 210 of the voltage increasing unit 21. The wake control circuit 222 receives the timing frequency output 206 of the oscillating frequency signal generator 201, and enables the frequency modulator 210 to operate the voltage increasing unit 21 in the wake mode, where the 5-volt operating voltage is generated at the voltage rectifier and stabilizer 212, upon receiving the wake control signal from the comparator circuit 221.

Initially, when the photo detecting unit 2203 has yet to receive the infrared control signal from the remote controller, the frequency output of the filter circuit 2205 does not correspond with the third oscillating frequency output 205 from the oscillating frequency signal generator 201, and the comparator circuit 221 does not generate the wake control signal to the wake control circuit 222. The voltage increasing unit 21 is thus maintained in the sleep mode at this time, where the voltage rectifier and stabilizer 212 does not.provide the operating voltage to the infrared receiving circuit 10 for reduced energy consumption.

Upon receipt by the photo detecting unit 2203 of the infrared control signal from the remote controller, the frequency output of the filter circuit 2205 will correspond with the third oscillating frequency output 205 from the oscillating frequency signal generator 201, and the comparator circuit 221 will generate the wake control signal to the wake control circuit 222. The wake control circuit 222 will subsequently enable the frequency modulator 210 of the voltage increasing unit 21, thereby resulting in operation of the voltage increasing unit 21 in the wake mode, where the 5-volt operating voltage is provided to the infrared receiving circuit 10 via the voltage rectifier and stabilizer 212 to enable operation of the infrared receiving circuit 10.

The wake control circuit 222 enables operation of the voltage increasing unit 21 in the wake mode for a predetermined time period, such as 10 seconds. The wake control circuit 222 continues to operate the voltage increasing unit 21 in the wake mode should the wake control circuit 222 continue to receive the wake control signal even after the predetermined time period has elapsed. When the photo detecting unit 2203 ceases to receive the infrared control signal from the remote controller, the comparator circuit 221 ceases to generate the wake control signal. Under such a condition, the wake control circuit 222 controls the voltage increasing unit 21 to operate in the sleep mode when the wake control circuit 222 ceases to receive the wake control signal from the comparator circuit 221 after the predetermined time period has elapsed. The infrared receiving circuit 10 thus does not draw electrical power from the input power source 200 at this time.

It has thus been shown that the energy conserving device 2 permits the use of a low voltage power source, such as a 1.5-volt battery cell, as a source of electrical power for the infrared receiving circuit 10 of a remote controlled apparatus 1. As such, installation of the remote controlled apparatus 1 is not limited to within the vicinity of an electrical outlet when the energy conserving device 2 of this invention is in use. In addition, due to the presence of the sleep control unit 22, the energy consumption of the infrared receiving circuit 10 can be effectively reduced so as to prevent the stored energy of the input power source 200 from being easily used up. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An energy conserving device adapted to be connected to an infrared receiving circuit of a remote controlled apparatus that receives an infrared control signal from a remote controller, said energy conserving device controlling supply of an operating voltage to the infrared receiving circuit, and comprising:

an input voltage unit for providing a voltage output that is lower than the operating voltage;

a voltage increasing unit connected to said input voltage unit and adapted to be connected to the infrared receiving circuit, said voltage increasing unit being operable in one of a wake mode, where said voltage increasing unit is enabled to generate the operating voltage from the voltage output of said input voltage unit and to supply the operating voltage to the infrared receiving circuit, and a sleep mode, where said voltage increasing unit is inhibited from generating the operating voltage to the infrared receiving circuit; and a sleep control unit including a detector circuit adapted to receive the infrared control signal from the remote controller, and having an output that varies upon receipt of the infrared control signal from the remote controller, a comparator circuit connected to said detector circuit, said comparator circuit comparing the output of said detector circuit with a reference signal, and generating a wake control signal upon determining that said detector circuit has received the infrared control signal from the remote controller, and a wake control circuit connected to said comparator circuit and said voltage increasing unit, said wake control circuit controlling said voltage increasing unit to operate in the wake mode for a predetermined time period upon receiving the wake control signal from said comparator circuit, and in the sleep mode when said wake control circuit ceases to receive the wake control signal from said comparator circuit after the predetermined time period has elapsed.

2. The energy conserving device of claim 1, wherein said input voltage unit includes an input power source and an oscillating frequency signal generator connected to said input power source, said oscillating frequency signal generator generating a first oscillating frequency output, a second oscillating frequency output, a third oscillating frequency output and a timing frequency output.

3. The energy conserving device of claim 2, wherein said voltage increasing unit is connected to said oscillating frequency signal generator, and receives the first oscillating frequency output therefrom.

4. The energy conserving device of claim 2, wherein said detector circuit is further connected to said oscillating frequency signal generator and receives the second oscillating frequency output therefrom, said detector circuit including a photo detecting unit having a resistance that varies according to wavelength of a light signal received thereby, said detector circuit having a frequency output that varies according to the resistance of said photo detecting unit.

5. The energy conserving device of claim 2, wherein said comparator circuit is further connected to said oscillating frequency signal generator and receives the third oscillating frequency output therefrom, the third oscillating frequency output serving as the reference signal, said comparator circuit generating the wake control signal when frequency of an output of said detector circuit corresponds to frequency of the third oscillating frequency output.

6. The energy conserving device of claim 2, wherein said wake control circuit is further connected to said oscillating frequency signal generator, and receives the timing frequency output therefrom.

* * * * *